UNITED STATES PATENT OFFICE.

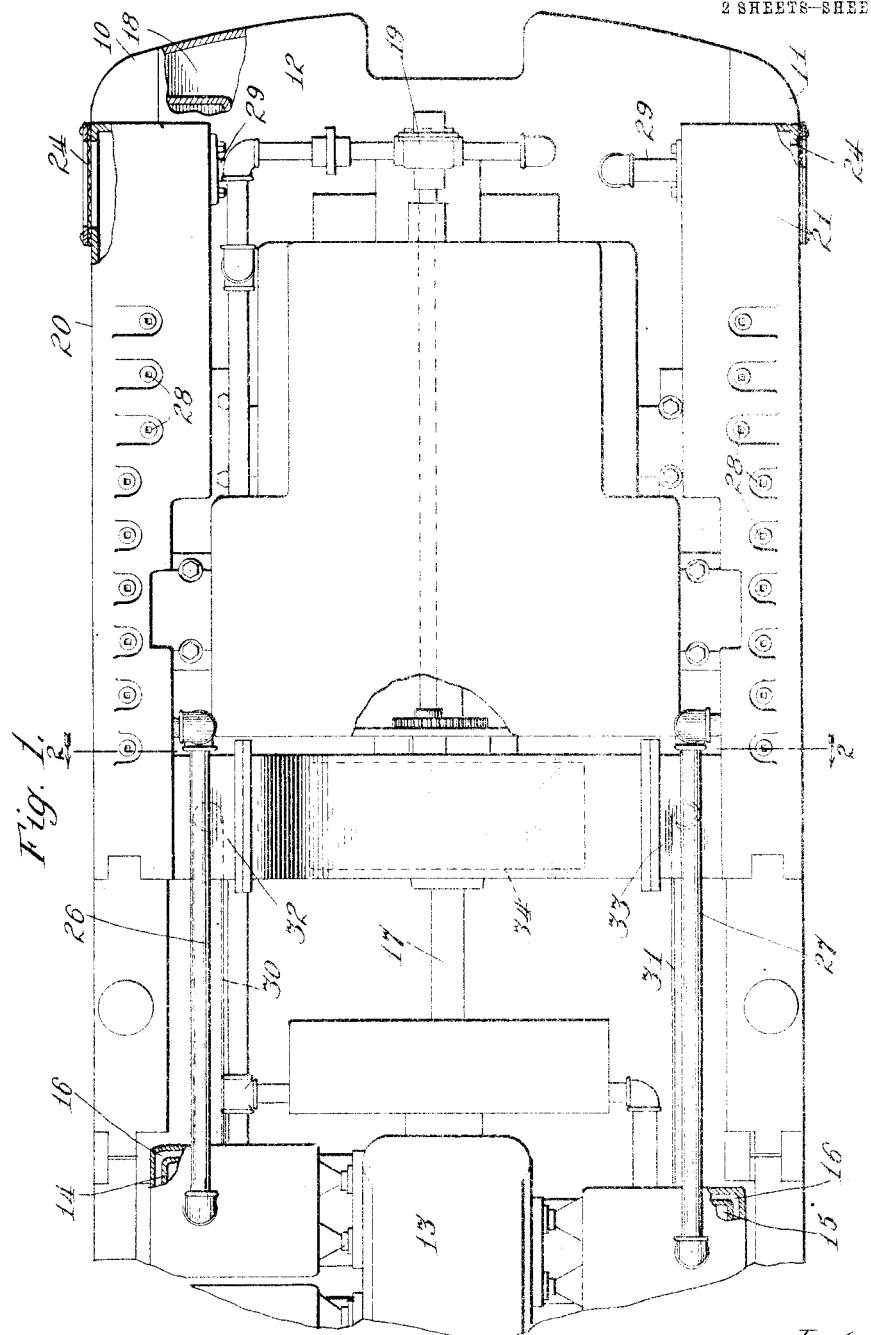

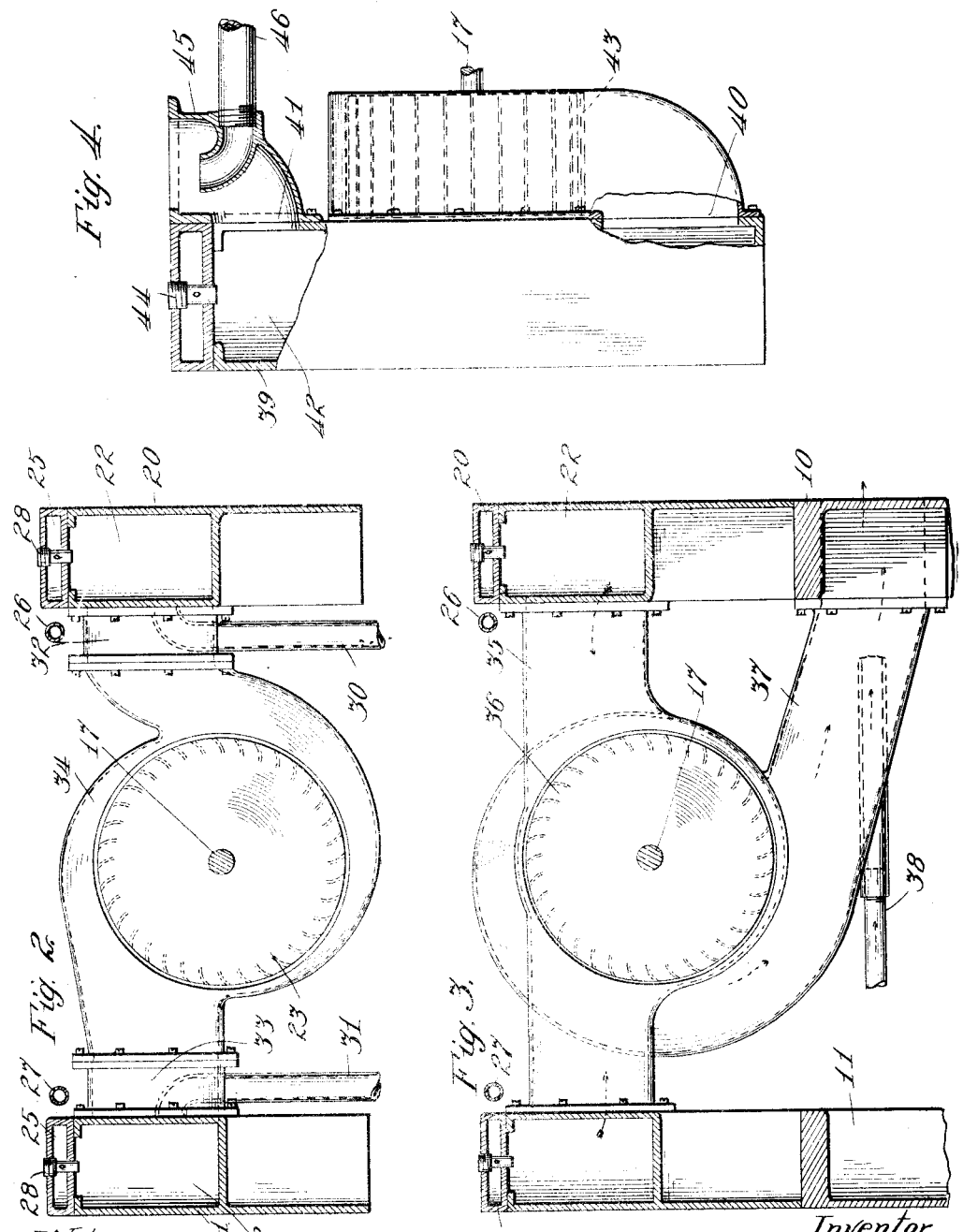

WILLIAM C. WHITCOMB, OF ROCHELLE, ILLINOIS, ASSIGNOR TO GEORGE D. WHITCOMB CO., A CORPORATION OF ILLINOIS.

MINE-LOCOMOTIVE.

1,055,845.  Specification of Letters Patent.  Patented Mar. 11, 1913.

Application filed January 29, 1912. Serial No. 674,129.

*To all whom it may concern:*

Be it known that I, WILLIAM C. WHITCOMB, a citizen of the United States, and resident of Rochelle, county of Ogle, and State of Illinois, have invented certain new and useful Improvements in Mine-Locomotives, of which the following is a specification, and which are illustrated in the accompanying drawings, forming a part thereof.

The invention relates to locomotives operated by an explosive motor and has for its object to provide such a locomotive which may be used in inclosed places, as the restricted passages of a mine, without an objectionable fouling of the surrounding air.

The invention is exemplified in the structures to be hereinafter described and illustrated in the accompanying drawings in which—

Figure 1 is a detail plan view of a locomotive embodying the features of improvement provided by the invention, some of the parts being broken away; Fig. 2 is a sectional view taken on the line 2—2 of Fig. 1; Fig. 3 is similar to Fig. 2 but illustrates a different embodiment of the invention and Fig. 4 is a detail plan view showing still another method of embodying the invention, some of the parts in this figure being shown in section.

Details of the side sills of a locomotive adapted to run in the restricted passages of a mine are shown in the drawings at 10 and 11. One of the end sills is represented at 12. The motor for operating the locomotive is carried by the side sills 10 and 11 and is generally designated by the numeral 13. As shown it is of the explosive type and comprises a plurality of cylinders, as 14, 15, each of which is surrounded by a water jacket 16. The power shaft of the motor is shown at 17.

Water for cooling the cylinders, as 14, 15 of the motor 13 is stored in a chamber 18 of the end sill 12. The water is circulated by a pump 19 through the water jackets 16 of the motor cylinders and through spray boxes 20 and 21 in the manner more fully described in the application of William F. Eckert and William C. Whitcomb, filed January 13, 1911, Serial No. 602,533, subject Mine locomotives. The spray boxes 20 and 21 are shown in cross section in Fig. 2 of the drawings. Each is of oblong rectangular shape and incloses a main chamber 22 through which air is driven from end to end of the box. As shown, a blower fan 23 mounted on the power shaft 17 of the motor 13 delivers air to the main chamber 22 of each of the spray boxes 20 and 21, adjacent one end of the box. This air is discharged through screened openings, one of which is located adjacent the other end of each of the boxes.

A duct 25 extends over the main chamber 22 of each of the spray boxes 20 and 21. Each of these ducts receives the cooling water which is circulated through the water jacket 16 of one or more of the cylinders, as 14, 15 of the motor 13, as through pipes 26 and 27, Fig. 1. This water is discharged in the form of a spray into the main chamber 22 of the corresponding spray box, as through a plurality of spray nozzles 28, and is returned to the storage chamber 18 of the end sill 12 through pipes 29.

The spray boxes 20 and 21 serve to cool the water which is circulated through the water jackets 16 of the cylinders, as 14, 15 of the motor 13 by the evaporation of a part of the water as it is discharged in the form of a spray through the air which traverses the main chambers 22 of the boxes. The air delivered through the screened openings 24 is therefore heavily laden with moisture. In carrying out the present invention the gases which are exhausted from the cylinders, as 14, 15 of the motor 13, are diluted and rendered less objectionable by mixing them with this moisture laden air before it is discharged into the surrounding atmosphere, as through the screened openings 24.

As shown in Figs. 1 and 2 of the drawings, the gases exhausted from the cylinders, as 14, 15 of the motor 13 enter the chambers 23 of the spray boxes 20 and 21 with the air delivered thereto by the fan 23 whereby they traverse the main chambers 22 of the spray boxes throughout the entire length of the boxes and are thoroughly mingled with the moisture laden air when they reach the screened openings 24. To this end, the exhaust pipes, as 30 and 31 of the motor are led into the connectors, as 32 and 33, used for joining the casing 34 of the blower fan 23 with the spray boxes.

In some instances it may be desirable to have the moisture laden air drawn out of the chambers of the spray boxes 20 and 21 by an exhaust fan. This arrangement is shown in Fig. 3 of the drawings where a common discharge trunk 35 communicates at its opposite ends with the main chambers 22 of the spray boxes 20 and 21. An exhaust fan 36 is located at one side of the discharge trunk 35 and draws the moisture laden air therefrom and discharges it on one side of the machine through a duct 37. The exhaust gases from the explosive motor are mingled with this moisture laden air before it is discharged into the surrounding atmosphere by leading the exhaust pipe, as 38, of the motor into the duct 37.

Fig. 4 of the drawings shows an arrangement wherein air is forced through the main chamber of a spray box by a blower fan and the exhaust gases from the explosive motor are mingled with the moisture laden air as it leaves said chamber. In this figure the spray box is shown at 39. It is similar in construction to those shown at 20 and 21 in Figs. 1 and 2 but has an air intake opening 40 near its base and an air discharge opening 41 near its top. Air is driven through the main chamber 42 of the spray box 40 by a blower fan 43 and the water used for cooling the motor cylinders is discharged into this chamber through spray nozzles, one of which is shown at 44. The discharge opening 41 of the chamber 42 communicates with an elbow 45 from which the moisture laden air is discharged into the surrounding atmosphere. Exhaust gases from the explosive motor are mingled with this moisture laden air by leading the exhaust pipe 46 of the motor into the elbow 45.

In traversing the restricted passages of a mine it may be necessary for a locomotive to pass in close proximity to the workmen employed therein and the locomotive may sometimes be required to remain in confined chambers where workmen are employed. The invention provides a locomotive using an explosive motor which may operate in this way without discharging the gaseous products of combustion from the motor cylinders in such concentrated form as to be objectionable to persons employed upon and about the locomotive.

I claim as my invention—

1. In combination, a chambered casing having an exhaust passage, means for forcing air through the chamber of the casing to the said exhaust passage, a spray nozzle delivering to the chamber of the casing, an explosive motor exhausting into the chamber of the casing and having a water jacket and a pump delivering to the said spray nozzle through the water jacket of the motor.

2. In combination, an explosive motor having a water jacket, a fan, an exhaust duct common to the motor and fan, a spray nozzle located in a wall of the said common exhaust duct of the motor and fan and a pump delivering water to the said duct through the said water jacket and the said spray nozzle, the fan and the pump being both driven by the motor.

3. In combination, an explosive motor and an evaporation chamber having a common exhaust passage, a water jacket for the motor, means for circulating water through the water jacket and the evaporation chamber, and means for forcing air through the evaporation chamber to the said common exhaust passage of the motor and chamber.

4. In combination, an explosive motor and an evaporation chamber having a common exhaust passage, means for supplying water to the evaporation chamber, and means for forcing air through the evaporation chamber to the said common exhaust passage of the motor and chamber.

WILLIAM C. WHITCOMB.

Witnesses:
Walter Dalzell,
Robt. Dail.